United States Patent [19]
Vieth

[11] Patent Number: 5,290,149
[45] Date of Patent: Mar. 1, 1994

[54] IMPELLER FOR AN AXIAL-FLOW TYPE FAN

[75] Inventor: Alfred Vieth, Bad Nauheim, Fed. Rep. of Germany

[73] Assignee: Braun Aktiengesellschaft, Frankfurt, Fed. Rep. of Germany

[21] Appl. No.: 835,461
[22] PCT Filed: Aug. 6, 1990
[86] PCT No.: PCT/DE90/00604
§ 371 Date: Feb. 25, 1991
§ 102(e) Date: Feb. 25, 1992
[87] PCT Pub. No.: WO91/03648
PCT Pub. Date: Mar. 21, 1991

[30] Foreign Application Priority Data
Sep. 7, 1989 [DE] Fed. Rep. of Germany ....... 3929738

[51] Int. Cl.$^5$ .............................................. F04D 29/38
[52] U.S. Cl. .............................. 416/188; 416/223 R; 416/234; 416/237
[58] Field of Search ............... 416/223 R, 234, 237, 416/188; 392/379–385, 360–369; 34/97

[56] References Cited

U.S. PATENT DOCUMENTS

| | | | |
|---|---|---|---|
| 2,339,602 | 1/1944 | Hagen | 416/223 R |
| 2,446,552 | 8/1948 | Redding | 416/188 |
| 4,514,618 | 4/1985 | Majthan et al. | 34/97 |
| 4,678,410 | 7/1987 | Kullen. | |

FOREIGN PATENT DOCUMENTS

| | | |
|---|---|---|
| 84737 | 3/1895 | Fed. Rep. of Germany. |
| 597146 | 5/1934 | Fed. Rep. of Germany. |
| 920090 | 7/1949 | Fed. Rep. of Germany. |
| 2327125 | 5/1973 | Fed. Rep. of Germany. |
| 3428650 | 8/1984 | Fed. Rep. of Germany. |
| 1326701 | 4/1963 | France. |
| 11464 | 9/1913 | United Kingdom. |

OTHER PUBLICATIONS

"Taschenbuch der Mathematik", pp. 214–218 (1969).
"Ventilatoren", p. 338, FIG. 327, New York, 1972.

Primary Examiner—Edward K. Look
Assistant Examiner—Christopher Verdier
Attorney, Agent, or Firm—Fish & Richardson

[57] ABSTRACT

The invention is directed to an impeller of an axial-flow type fan, in particular for appliances for drying and dressing hair, in which adjacent blades overlap each other completely over the radial extent of the blades in the edge regions of the blades. To ensure that the injection-molded impeller is capable of being ejected from the mold, the angle of opening is required to be smaller than or equal to the angle of rotation.

7 Claims, 8 Drawing Sheets

IMPELLER FOR AN AXIAL-FLOW TYPE FAN

This invention relates to an impeller of an axial-flow type fan, in particular for appliances for drying and dressing hair, with a hub structure, a plurality of blades integrally formed with a circumferential outer surface of the hub structure and arranged on the hub structure in a rotationally symmetrical manner, each blade being offset relative to an adjacent blade by an angle of rotation, in which adjacent blades completely overlap each other in the area of the blade leading edge and the blade trailing edge over the radial extent of the blades, and in which an opening angle formed by a projection of the leading edge and the trailing edge of each blade on a a plane normal to the axis of rotation of the impeller satisfies the condition that the opening angle be smaller than or equal to the angle of rotation.

BACKGROUND OF THE INVENTION

An impeller incorporating these features is already known from FR-PS 1 326 701. This impeller is particularly provided to accomplish an improved pressure stability in dependence on the flow rate. The essential feature of the impeller is that the efflux surfaces of the blades have trailing edges curving inwardly in opposite direction. Impeller blades of such a profile produce a stable air stream on their trailing edges along the entire zone of pressure flow of the blower, in contrast to an unstable flow developing in blowers with a conventional blade profile in the presence of specific pressure relations and specific amounts of flow. Preferably, the trailing edges of the blades are arranged in parallel with the leading edges of the blades, satisfactory results being obtained also if the alignment of the leading edges departs from that of the trailing edges by as much as 15 degrees. The curvature in opposite direction of the trailing edges of the blades relating only to the last fourth of the efflux surfaces, it may nevertheless be advantageous in certain cases that this curvature in opposite direction begins directly after the area between the trailing and leading edge of the blades. The rotors may be integrally manufactured by casting, injection-molding or milling, and may be made of an aluminum alloy, stainless alloyed steel, plastic, or a similar material.

The teaching is essentially aimed at obtaining a blade geometry such that the direction vector of the leading and trailing edge of each blade extends largely in parallel. The design method selected for this purpose consists in projecting various profiles on concentric circles. This results in a type of surface for the description of the blade geometry which cannot be described by rulers. Generating and making a pattern of such a type of surface incurs increased expenditure in all stages of the design and manufacture of such an impeller, starting with the determination of the surface points in the design stage up to the manufacture of the tools or injection molds. Moreover, the design method as it appears from FR-PS 1 326 701 does not ensure that an impeller with a predetermined blade profile is in fact ejectable from the mold, that is, it does not ensure that a slide of the injection mold inserted between two blades is movable radially to the axis of rotation of the impeller without a collision occurring. Overall, FR-PS 1 326 701 does not suggest a design for the manufacture of an impeller in which it is ensured that the impeller is capable of being manufactured by injection molding in addition to being ejectable from the mold, with the individual blade profile being practically exclusively determined by fluidic or physical, rather than manufacturing or tool related, side constraints.

A further impeller is known from U.S. Pat. No. 4,678,410. The impellers described in this prior publication have shown excellent results in practice on account of their high efficiency, their particular engineering design lending itself to large-scale production applying injection-molding processes. It is especially this last-mentioned advantage of the known impeller which is remarkable in so far as the problem of ejecting such impellers from the mold has been solved in a simple manner, in spite of undercuts existing between the blades and the hub structure, by using an injection mold of a straightforward structure. However. the blades of the known impeller are shaped and arranged on the circumferential outer surface of the hub structure such that there is no overlap of adjacent blades. A gap is invariably maintained between adjacent blades.

In the presence of this known and already largely optimized impeller, it is nevertheless desirable for a variety of reasons to provide an impeller with overlapping blades. To begin with, the efficiency of an impeller can be further increased by having blades of a suitable profile overlap each other. In the second place, the use of impellers having overlapping blades makes specific supplementary structures redundant which otherwise would be necessary to protect the user. Thus, the use of an impeller with overlapping blades obviates the provision of supplementary structures, as for preventing the user from accidentally reaching through the impeller with thin metallic objects into the interior of the axial-flow fan or the appliance for drying and dressing hair, thereby eliminating the danger of contact with live parts inside the axial-flow fan or the hair dryer. Moreover, the design methods hitherto known and the methods derived therefrom for producing test specimens and injection molds have not been perfected to a degree ensuring ejection of an impeller with overlapping blades from the mold, that is, its manufacture by injection molding has not been technically feasible. The absolutely necessary prerequisites for a manufacture of the impellers by injection molding, such as the ejective capability, a realistic slide geometry and slide kinematics of the injection mold, presented material difficulties in the manufacture of such an impeller as an injection-molded plastic part, in addition to imposing restrictions on a blade profile affording optimum fluidic conditions.

SUMMARY OF THE INVENTION

By contrast, the present invention is suitable for solving the problem of providing an impeller geometry of an axial-flow type fan, in which each blade and the next succeeding blade overlap each other while at the same time the impeller can be manufactured by injection-molding processes, including in particular the provision of a suitable slide geometry and slide kinematics enabling the impeller to be ejected from the mold independent of the special configuration of the blade profile. This problem is solved by an impeller incorporating the features of the prior art initially referred to, in which the profile formed by the outer edge of each blade has a curvature of constant sign, and all cross-sections of the blades normal to the axis of rotation form straight lines whose extensions intersect a vanishing line associated with each blade.

As will be explained in greater detail in the subsequent description of the embodiments, an impeller designed under these side constraints is by all means ejectable from the mold, irrespective of the particular blade profile selected, that is, it can be manufactured using injection-molding processes. The slide geometry and slide kinematics of the injection mold, in particular the shape of the slide and the selected direction of slide withdrawal, can be readily specified in theory and put into practice with due consideration of the side constraints set forth in the foregoing. In particular, slide geometries may be contemplated extremely advantageously which obviate the necessity of separating the slides on the blade upper and lower surface. Further, the blade outer edges may not only lie on circumferential outer surfaces of a cylinder but also on circumferential outer surfaces of any rotationally symmetrical body, including, for example, the circumferential outer surfaces of spheres or cones.

Because all cross-sections of the blade normal to the axis of rotation have extension lines intersecting a vanishing line associated with each blade, a particularly straightforward construction of the entire blade surface results, and optimization efforts in respect of the efficiency of the impeller are materially simplified.

The configurations indicated in the subclaims have the following particular advantages: The provision of an acute angle opening between the blade leading edge and the blade trailing edge of adjacent blades in the direction of the blade inner edge affords manufacturing advantages in respect of the ejective capability from the mold. The geometry of the slide of the injection mold and the slide kinematics, including thus in particular the direction of slide withdrawal, may be within specific tolerances without questioning the ejective capability of the impeller. Owing to this acute-angled alignment of adjacent blade edges, ejection from the mold is ensured, one is, so to speak, on the safe side. However, it is noted that also a parallel alignment of the trailing and leading edge of adjacent blades has advantages. By this means, the theoretical profile predetermined in the system of Cartesian coordinates is only little deformed when transformed into the system of cylindrical coordinates which is better suited for the description of the impeller geometry. The properties of the theoretically determined optimum profile (in Cartesian coordinates) are substantially maintained owing to a largely undeformed transformation to the real impeller. In practice, a compromise is reached between the advantages of the acute-angled and the parallel alignment of adjacent blade edges by selecting a very acute angle.

The special arrangement of the extension line of a blade leading edge and blade trailing edge such that this extension line passes through the axis of rotation and a vanishing line is based on a simple, one-parameter design principle. The blade geometry may be modified within wide limits merely by varying the position of the vanishing line relative to the axis of rotation.

Arranging the vanishing lines of each blade within a circle formed by the maximum diameter of the hub structure effects only a minor deformation of the theoretically determined profile of the blade surface when transforming the profile from the system of Cartesian coordinates to the system of cylindrical coordinates.

BRIEF DESCRIPTION OF THE DRAWINGS

Further advantages of the present invention will become apparent from the subsequent description of embodiments and the accompanying drawings.

In the drawings.

Figure 1:
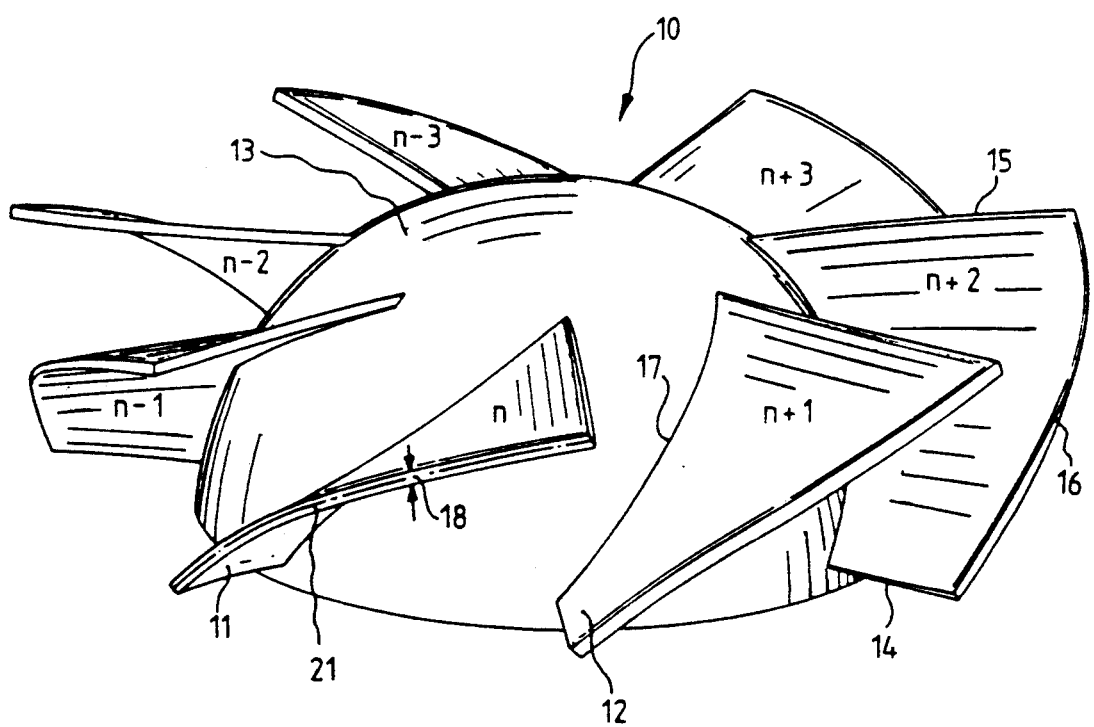
FIG. 1 is a perspective view of an impeller unit with overlapping blades.

The representation of an impeller with overlapping blades of the invention as shown in FIG. 1 of the drawings essentially serves the purpose of defining and explaining the terms herein used. Reference numeral 10 generally designates the impeller unit. On the circumferential outer surface of a hub structure 13, a plurality of identically configured blades are arranged in a rotationally symmetrical manner, in which the nth blade is assigned reference numeral 11 and the (n+1)th blade reference numeral 12. The surface of each blade is bounded by a blade trailing edge 14, a blade leading edge 15, a blade outer edge 16 and a blade inner edge 17. Each blade is of a specific profile thickness 18 which may be constant over the entire extent of the blade profile 21 or, alternatively, may also be variable. The determinations of impeller parameters indicated in the further description of the subsequent embodiments and in the claims relate to impellers in which the profile thickness 18 of the blades 11, 12 tends to zero. Accordingly, the blade geometry is described by a surface whose end remote from the hub structure 13 is illustrated by means of the profile 21. After this surface describing the blade geometry is determined, the blade profile, that is, the thickness of profile, is in a way "modeled" onto the surface. This is accomplished preferably in that the blade upper side and the blade underside are arranged relative to the two-dimensional blade profile surface such that a cross-section of the blade normal to the axis of rotation results in parallel lines of intersection of the blade upper side, the blade profile surface and the blade underside.

Figure 2:
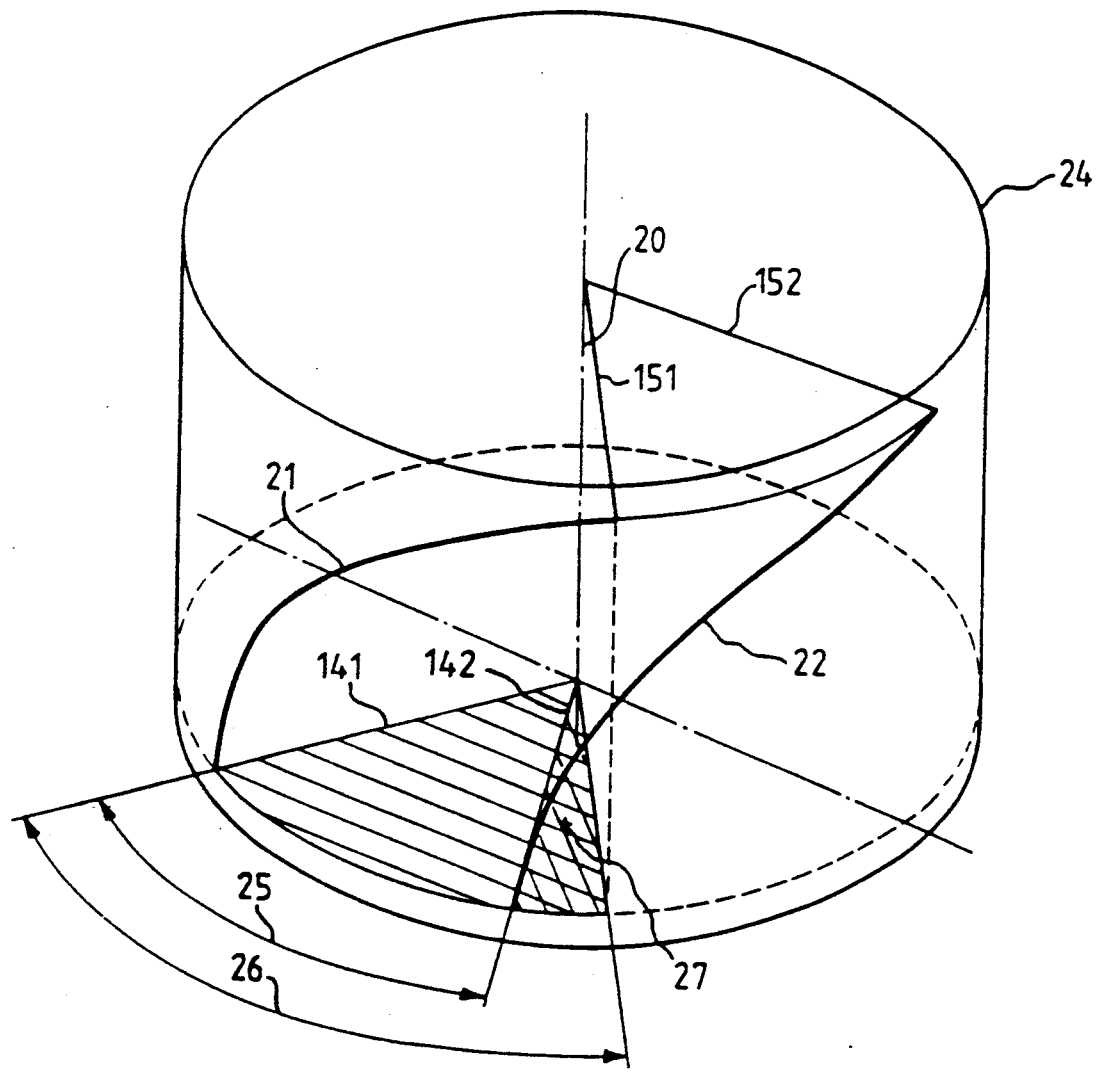
FIG. 2 is a diagrammatic perspective view of an impeller geometry with overlapping blades, taking by way of example the design disclosed in U.S. Pat. No. 4,678,410.
Figure 3:
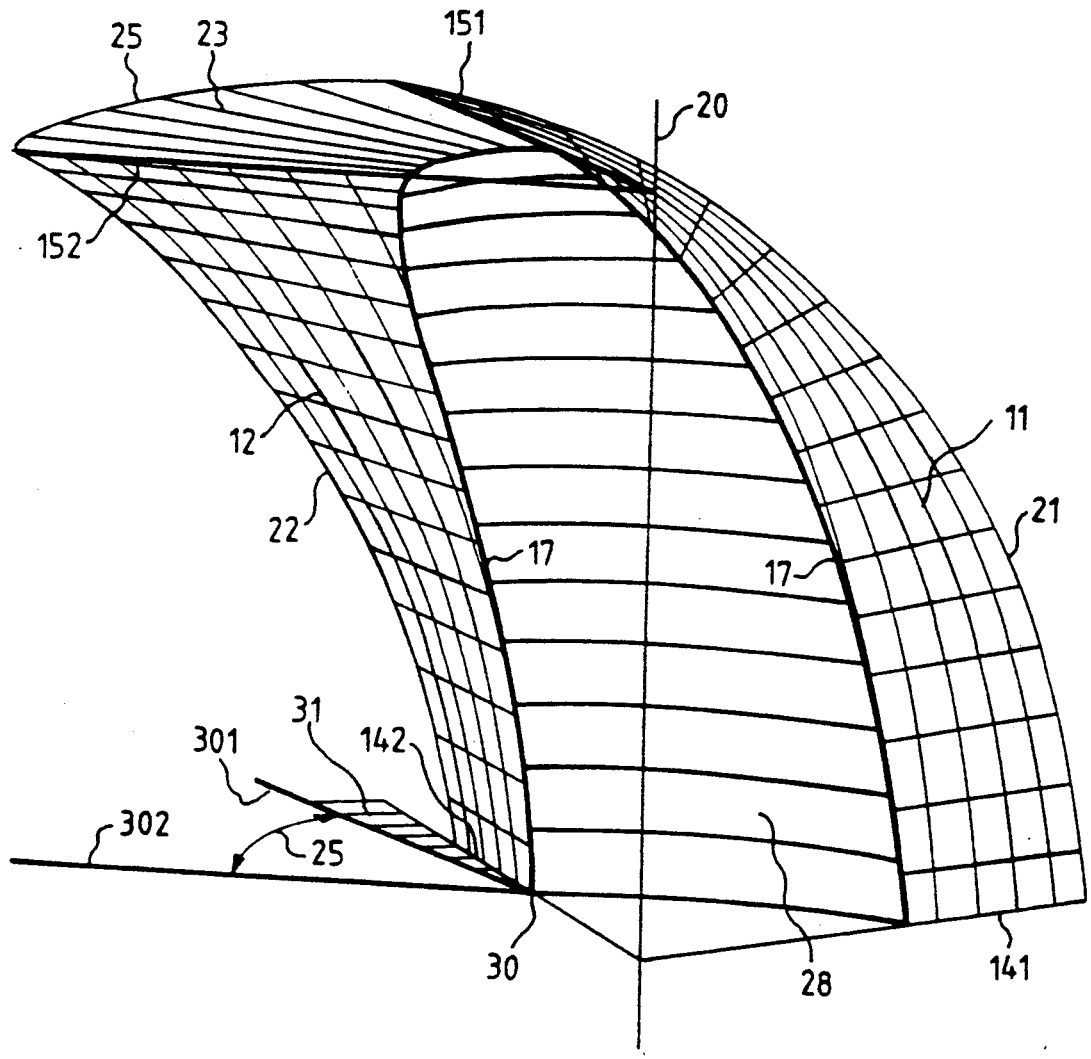
FIG. 3 is a view of the slide geometry and slide kinematics in the impeller of FIG. 2.

FIGS. 2 and 3 demonstrate, with reference to the prior art U.S. Pat. No. 4,678,410, which problems are encountered if this prior known impeller geometry is used in the design of impellers having overlapping blades. FIG. 2 is a diagram showing the principle of the impeller geometry, reference numeral 20 indicating the axis of rotation of the impeller. The blade outer edges are indicated by the profile 21 of the nth blade and the profile 22 of the (n+1)th blade lying on the circumferential outer surface of a cylinder 24. The arrangement of the individual blades on the circumferential outer surface of the cylinder 24 is symmetrical about the axis of rotation 20, the blades being offset in relation to each other at an angle of rotation 25. The hub structure playing no decisive role in the subsequent contemplations, it is not shown in these Figures for reasons of clarity. According to the principle of blade design set forth in DE-AL 34 28 650, all cross-sections of the blade profile surface normal to the axis of rotation 20 of the impeller form straight lines whose extensions intersect the axis of rotation 20. Consequently, it is in particular the blade leading edges 151 and 152 and the blade trailing edges 141 and 142 of the nth and (n+1)th blades 11, 12 that intersect the axis of rotation 20. The opening angle 26 designates the angle formed by a projection of the blade leading edge 151 and the blade trailing edge 141 of each blade 11, 12 on a plane normal to the axis of rotation 20.

Finally, the overlap area between adjacent blades between the trailing edge 142 of the blade 12 and the leading edge 151 of the blade 11 is assigned reference numeral 27.

The profiles 21 and 22 of the nth and, respectively, (n+1)th blade 11, 12 may assume any arbitrary shape, with the restriction that the curvature be of a constant sign.

Further, it shall be assumed that the indicated course of the profile 21, 22 ensures an optimum efficiency of the impeller. The only open question then remaining to be answered is whether an impeller configured in this manner can also be manufactured in large quantities by injection-molding processes, in particular whether it is ejectable from the mold. To answer this question, FIG. 3 shows part of the impeller 10 and the slide geometry 23 of a slide of the injection mold. The cross-hatching indicates the profile surfaces of the nth blade 11 and the (n+1)th blade 12. An area of the circumferential outer surface 28 of the hub structure 13 between the blade 11 and the blade 12 is hatched horizontally. In the areas relevant to the present investigation, the geometry 23 of the slide of the injection mold is formed by the circumferential outer surface 28 of the hub structure 13 at the head end, that is, in the area proximate to the axis of rotation 20, and by the surface profile of the underside of the blade 11 as well as the upper side of the blade 12 in the side areas. During injection molding of the impeller, the slide is in the position illustrated in FIG. 3. On completion of the injection-molding process followed by hardening of the injection-molded part, the slide is retracted from the position shown, being in particular withdrawn outwardly away from the hub structure 13. While FIG. 3 shows only one slide, it will be understood that an injection mold will require the provision of a number of slides corresponding to the number of impeller blades.

The injection-molded part is ejectable from the mold if the slides are readily removable from the molded part, that is, if the path of the slide, as it withdraws, is not "obstructed" by any parts of the impeller just produced by injection molding. Looking first at the leading edges 151 and 152 of the blades 11, 12, the direction of withdrawal of the slide with its geometry 23 is restricted by the angle of rotation 25 formed by the blade leading edges 151 and 152. If the slide is withdrawn in a direction lying outside the angular range defined by the blade leading edges 151 and 152, this results necessarily in a destruction of blade 11 or blade 12 in the area of the blade leading edges 151 or 152, depending on the direction in which the withdrawal of the slide departs from the predetermined angular range. Assuming a direction of withdrawal lying within the range of the angle of rotation 25 and possible in respect of the ejective capability of the impeller in the area of the blade leading edges 151, 152, it remains to be investigated whether this angular range of the directions of slide withdrawal also allows ejection in the area of the trailing edges 141, 142 of the blades 11, 12. To this end, the angular range 25 of the possible directions of slide withdrawal as determined by the blade leading edges 151 and 152 is plotted in point 30 which is the point of intersection of the blade trailing edge 142 and the blade inner edge 17. The angular range in point 30 is determined by the straight line 301 as a parallel to the blade leading edge 151, and by the straight line 302 as a parallel to the blade leading edge 152. As will be clearly seen, the trailing edge 142 of the blade 12 is outside the angular range 25 as defined by the straight lines 301 and 302. As "best possible", yet practically still not feasible, withdrawal direction, withdrawal of the slide in the direction of the straight line 301 may be considered. However, this withdrawal direction results in a collision of the slide in the area of the blade trailing edge 142, destroying the injection-molded part. On the other hand, if the preferred direction of slide withdrawal were in the direction of the blade trailing edge 142, this would result in a collision of the slide with the blade leading edge 151, destroying the blade in this area. Thus it shows that ejection from the mold is not possible with this prior impeller design with overlapping blades in which sections of the blades 11, 12 normal to the axis of rotation 20 form straight lines whose extensions intersect the axis of rotation 20. In the angular range between the straight line 301 and the blade trailing edge 142, a collision area 31 exists in which the slide is bound to collide with the blades.

In summary, it can be stated that the design principle as disclosed in U.S. Pat. No. 4,678,410 is not suited for use on impellers with overlapping blades, since it presents the problem that the part is not ejectable from the mold.

Figure 4:
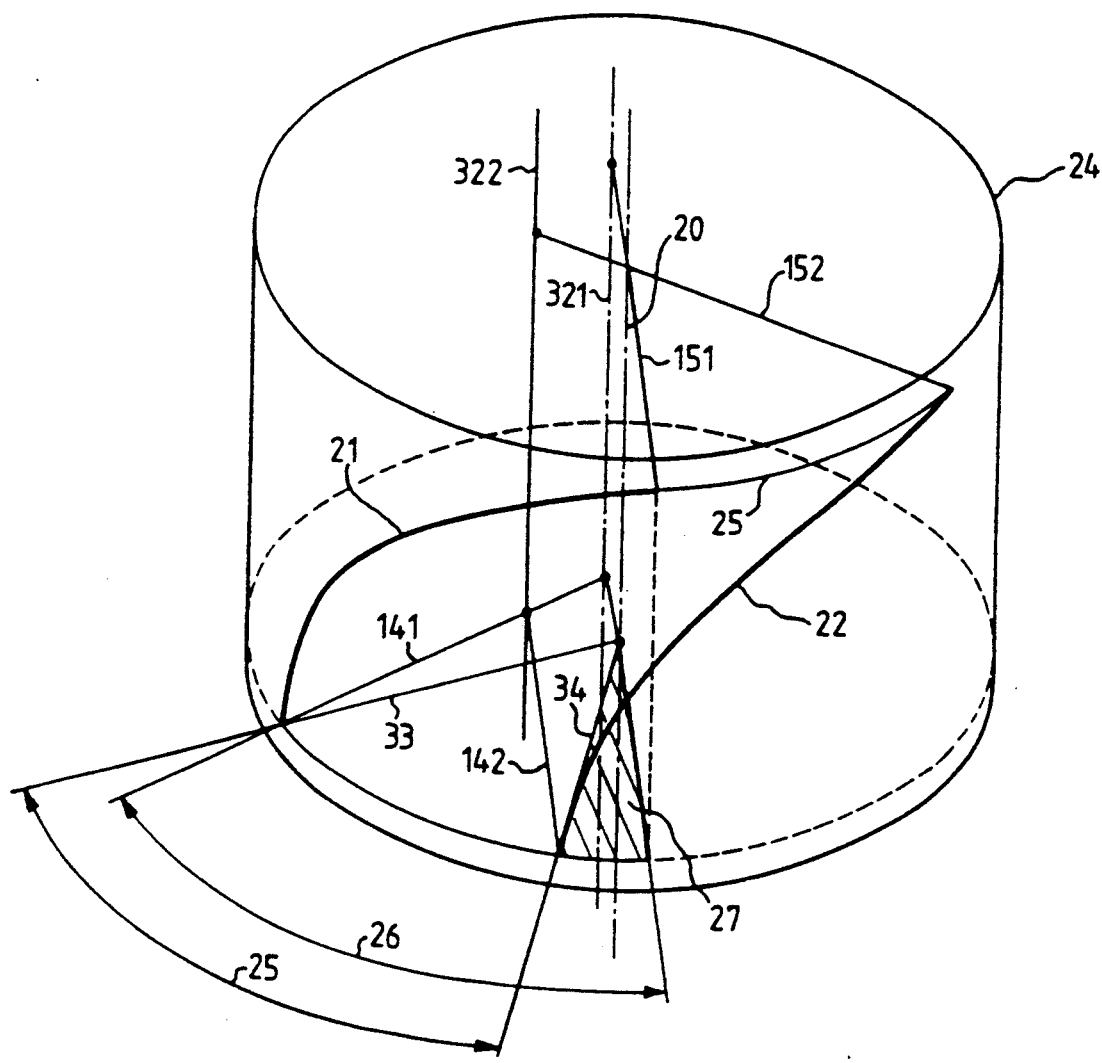
FIG. 4 is a diagrammatic perspective view of an impeller geometry with overlapping blades illustrating a first embodiment of the invention.

In FIG. 4, a geometry of an ejectable impeller with overlapping blades according to a first embodiment of the present invention is shown diagrammatically. The mode of representation and the assignment of reference numerals largely corresponding to the representation of FIG. 2, only departures therefrom and peculiarities will be discussed in more detail in the following. The profile surfaces are bounded by the profile 21 of the nth blade and the profile 22 of the (n+1)th blade. The blade leading edges 151 and 152 intersect each the axis of rotation and a respective vanishing line 321 and 322 arranged in the space in parallel with the axis of rotation, yet spaced therefrom by a specific amount. By contrast, the blade trailing edges 14 intersect only the associated vanishing lines, for example, the blade trailing edge 142 intersects the vanishing line 322. The same applies to all cross-sections of the profile surfaces of the blades 11, 12 normal to the axis of rotation 20 which form straight lines intersecting the associated vanishing lines 321, 322, but not the axis of rotation 20. Finally, the trailing edge 142 of the (n+1)th blade 12 is disposed in parallel with or at an acute angle 35 (FIG. 5) to the leading edge 151 of the nth blade 11, the angle opening towards the blade inner edge 17. By suitably selecting the positioning of the vanishing lines 321 and 322 relative to the axis of rotation 20, it follows from this concept that the angle of rotation 25 as the angle between the blade leading edges 151 and 152 is greater than or equal to the opening angle 26 resulting as the angle between the projection of the leading edge 151 and trailing edge 141 of each blade 11 on a plane normal to the axis of rotation 20 of the impeller 10.

Figure 5:
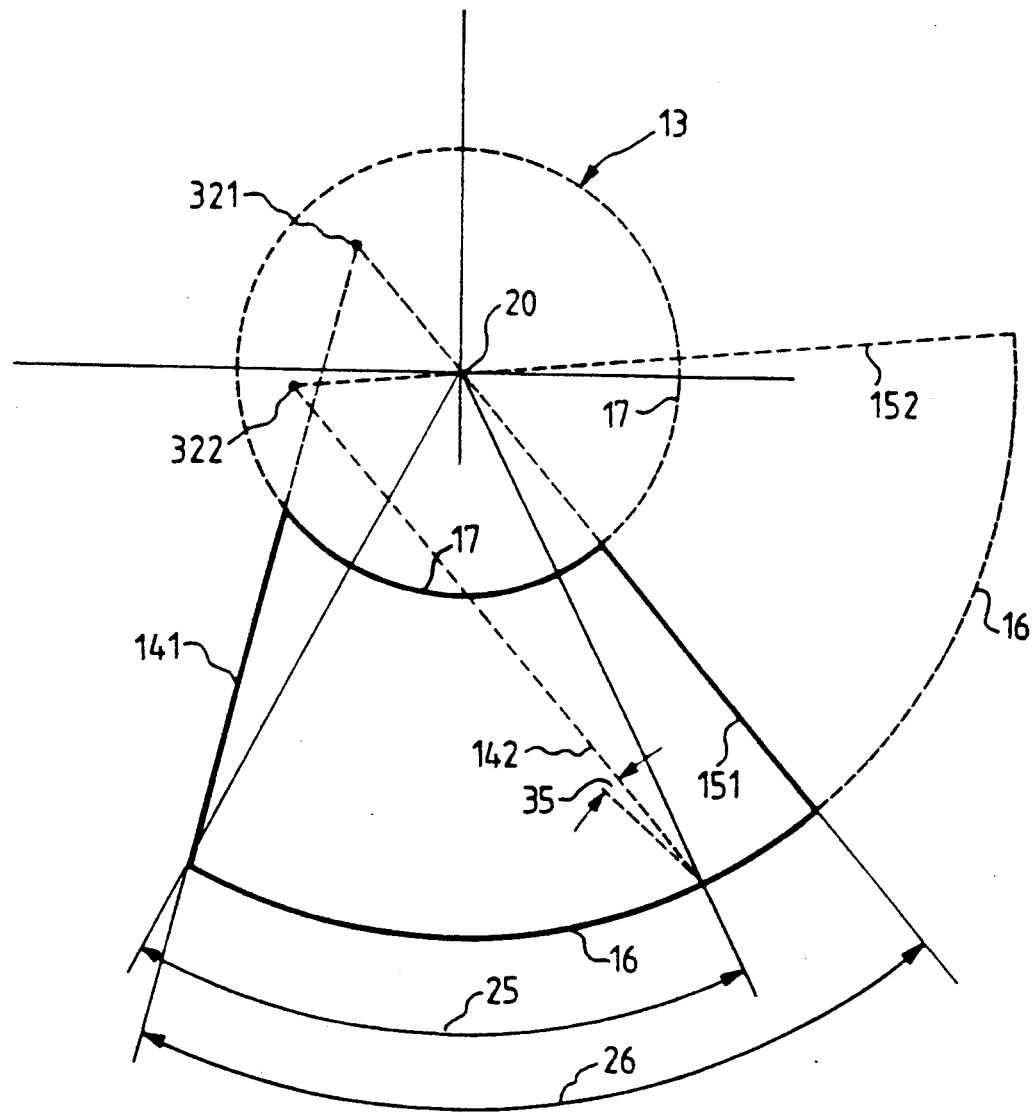
FIG. 5 is a diagrammatic view of the impeller geometry of FIG. 4, projected on a plane normal to the axis of rotation.

FIG. 5 illustrates a projection of the profile surfaces of the blades 11, 12 of FIG. 4 on a plane normal to the axis of rotation 20. The most important design features of the impeller of FIG. 4 will be summarized briefly with reference to FIG. 5. The blade leading edges 151, 152 intersect the axis of rotation 20 as well as the associated vanishing lines 321 and 322. The blade trailing edges 141, 142 as well as the extensions of all other lines of intersection of the blade profile surfaces on a plane normal to the axis of rotation 20 intersect only the vanishing lines 321, 322, excluding the axis of rotation 20. The trailing edge 142 of the (n+1)th blade 12 is arranged in parallel with or at an acute angle 35 to the leading edge 151 of the nth blade 11, the angle opening towards the blade inner edge 17. The blades 11, 12 overlap each other completely over the radial extent of the blades in the range of the blade leading edge 151 and the blade trailing edge 142. The angles determining the design with regard to the ejective capability of the molded part are the angle of rotation 25 through which the nth blade 11 has to be rotated about the axis of rotation 20 in order to overlap with the (n+1)th blade, and the opening angle 26. This opening angle 26 is formed on a plane normal to the axis of rotation 20 by projecting the leading edge 151 and the trailing edge 141 of each blade on this plane.

Figure 6:
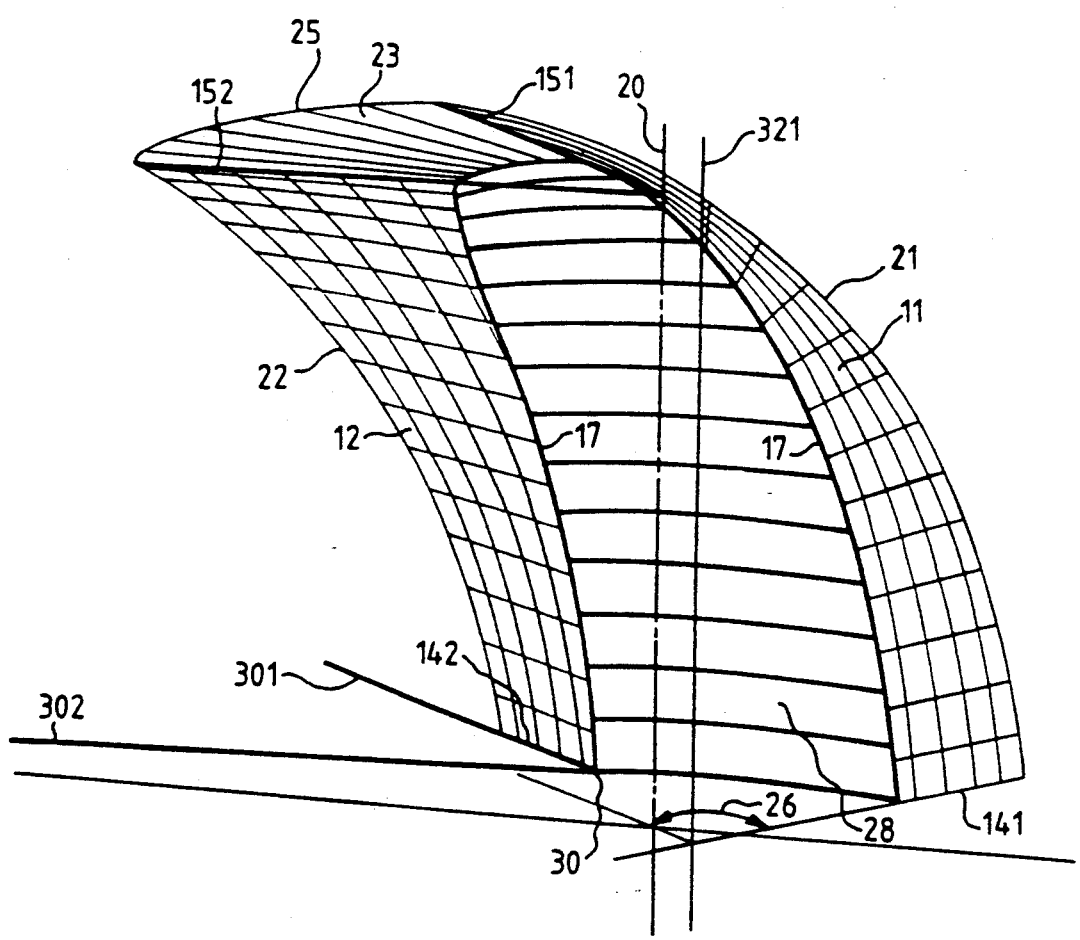
FIG. 6 is a view of the slide geometry and slide kinematics in the impeller of FIGS. 4 and 5.

Referring to FIG. 6 corresponding to the representation of FIG. 3 as regards the slide geometry, it will now be explained that the ejective capability of the molded impeller constructed in accordance with FIGS. 4 and 5 is ensured if the opening angle 26 is maintained at a value smaller than or equal to the angle of rotation 25. FIG. 6 shows the characteristic design features of the first embodiment of the present invention. The blade leading edges 151 and 152 intersect the axis of rotation and the associated vanishing lines, FIG. 6 showing only the vanishing line 321 associated with the nth blade 11. By contrast, the blade trailing edges 141 and 142 intersect only the corresponding associated vanishing lines. Substantial parts of the slide geometry 23 are determined by an area of the circumferential outer surface 28 intermediate the blades 11, 12 as well as the underside of the blade 11 and the upper side of the blade 12. The direction of slide withdrawal in the area of the blade leading edge is limited by the blade leading edges 151 and 152. Considering solely the upper area of the blade, any angle of withdrawal lying within the angular range between the blade leading edges 151 and 152 is possible. The possible angular withdrawal range of the slide is plotted by means of the straight lines 301 and 302 in point 30 defined by the point of intersection of the blade trailing edge 142 with the blade inner edge 17. In this embodiment, the straight line 301 extends in parallel with the blade leading edge 151, the straight line 302 extending in parallel with the blade leading edge 152.

As will be clearly recognized, there is, in contrast to the example of FIG. 3, no collision area 31, the blade trailing edge 142 extending rather into overlapping relationship with the straight line 301. Thus it is possible in this embodiment to retract the slide from the impeller in the direction of the straight line 301 without involving the risk of colliding with impeller parts. This particular case in which the blade trailing edge 142 extends in parallel with the straight line 301 occurs precisely if the angle of rotation 25 assumes values identical with the opening angle 26, that is, if the two angles 25, 26 are equal. Thus it shows that an impeller having overlapping blades and providing the possibility of ejection from the mold can be put into practice if the aforementioned design conditions are satisfied.

Figure 7:
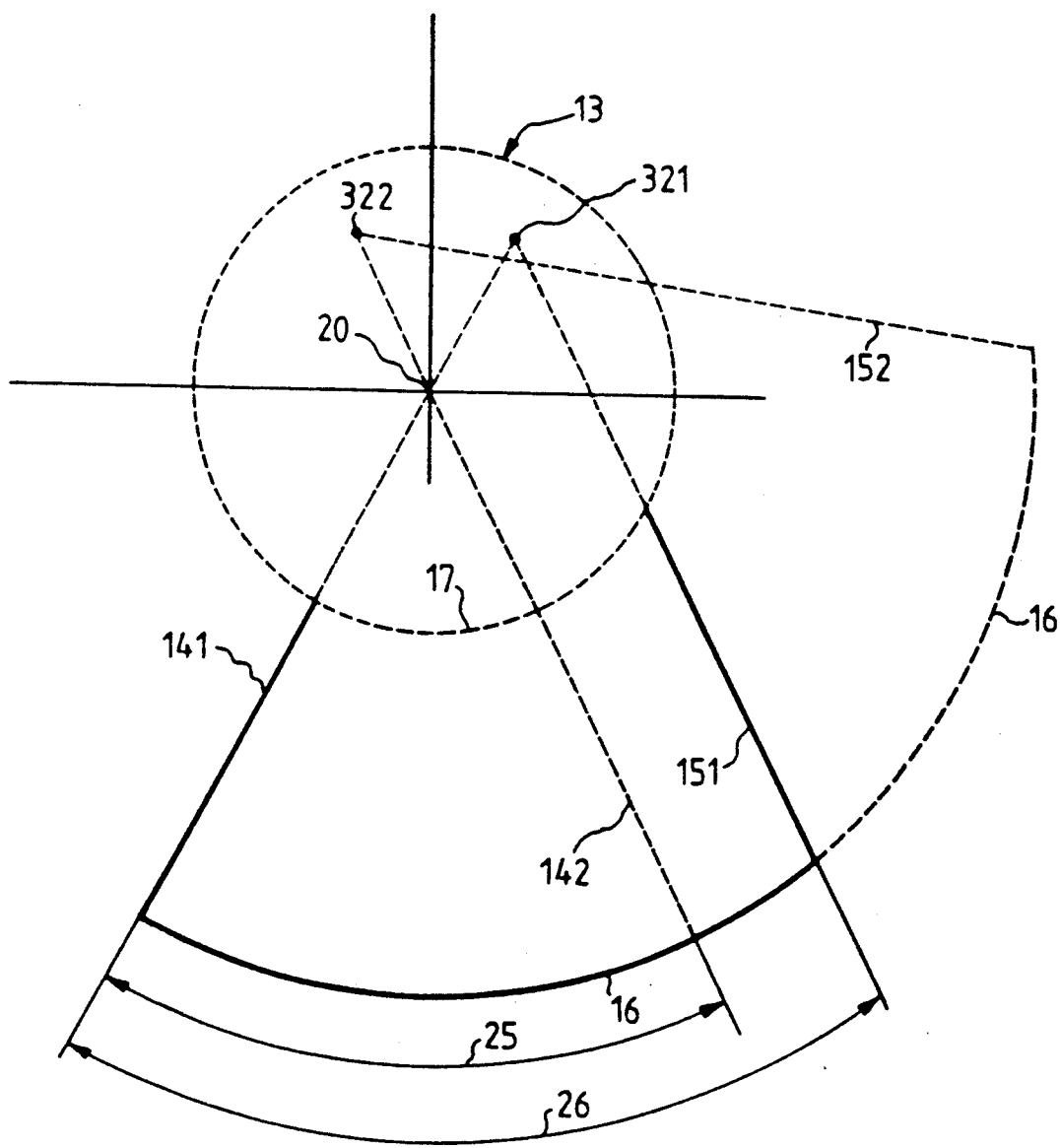
FIG. 7 is a diagrammatic view of an impeller geometry with overlapping blades illustrating a second embodiment of the invention, projected on a plane normal to the axis of rotation.

A second embodiment of the present invention is illustrated in FIG. 7. In contrast to the representation of FIG. 5, the extension lines of the blade trailing edges 141, 142 intersect the axis of rotation 20 and the associated vanishing lines 321 and 322. The extensions of the blade leading edges 151 and 152 and of all other lines of intersection formed by blade sections normal to the axis of rotation 20 intersect only the vanishing lines 321 and 322, excluding the axis of rotation 20. The design of the impeller of FIG. 7 is otherwise identical with the geometry illustrated in FIGS. 4 to 6. Analogous considerations reveal that this impeller is likewise readily ejectable from the mold. Here, too, the particular case of equality of angle of rotation 25 and opening angle 26 applies, as can be shown easily with reference to the laws of beams.

Figure 8:
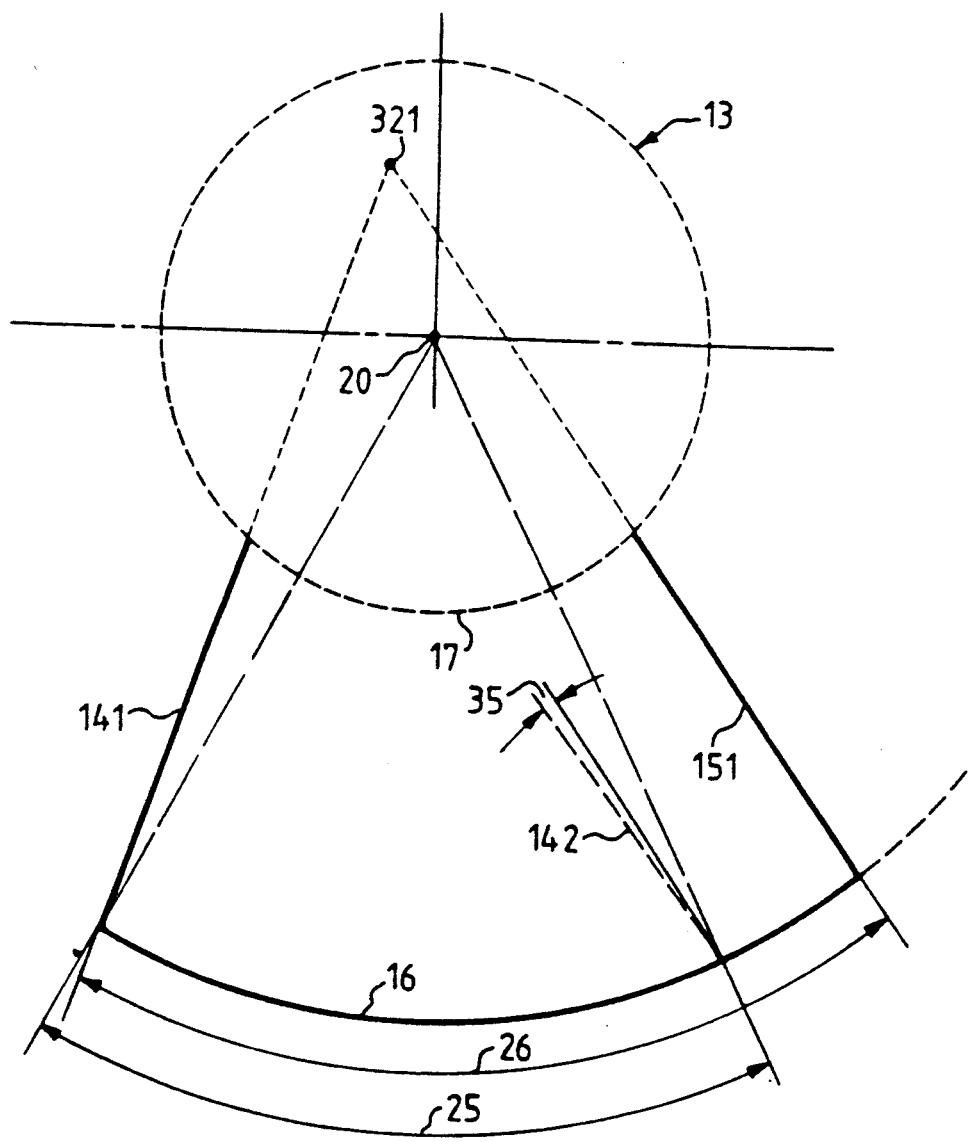
FIG. 8 is a diagrammatic view of an impeller geometry with overlapping blades illustrating a third embodiment of the invention, projected on a plane normal to the axis of rotation.

FIG. 8 shows a third embodiment of an ejectable impeller, projected on a plane normal to the axis of rotation 20. Neither the extension of the blade leading edge 151 nor the extension of the blade trailing edge 141 intersects the axis of rotation, both extension lines intersecting only with the vanishing line 321. Also, the leading edge 151 and the trailing edge 142 of the nth blade 11 and, respectively, the (n+1)th blade 12 are at an acute angle 35 to each other which opens in the direction of the blade inner edge 17 or the axis of rotation 20. This embodiment likewise satisfies the condition that the opening angle 26 formed by the blade leading edge 151 and the blade trailing edge 141 be smaller than the angle of rotation 25. Considerations analogous to the first embodiment reveal that an impeller with blades arranged in accordance with FIG. 8 is again ejectable from the mold.

It will be understood that the present invention is not limited to the embodiments described but is intended to cover any impeller design with overlapping blades in which the condition that the opening angle 26 be smaller than or equal to the angle of rotation 25 is satisfied.

We claim:

1. An impeller of an axial-flow type fan, for appliances for drying and dressing hair comprising hub structure having a cylindrical outer surface and an axis of rotation, a plurality of blades integrally formed with said circumferential outer surface of said hub structure and arranged on said hub structure in a rotationally symmetrical manner, each said blade having an inner edge at said outer surface of said hub structure, a leading edge, a trailing edge and an outer edge, each said blade being offset relative to an outer edge, each said blade being offset relative to an adjacent blade by an offset angle of rotation, in which adjacent blades completely overlap each other in the area of said leading edge of each blade and said trailing edge of the adjacent blade over the radial extent of said blades, in which an opening angle formed by a projection of said leading edge and said trailing edge of each blade on a plane normal to said axis of rotation satisfies the condition that said opening angle is smaller than or equal to said offset angle of rotation, the profile formed by said outer edge of each said blade has a curvature of constant sign, and all cross-sections of said blades normal to said axis of rotation form straight lines whose extensions intersect a respective imaginary line associated with a respective one of said blades.

2. The impeller of claim 1 wherein said leading edge blade and said trailing edge of each said blade diverge at an acute angle extending from said outer edge to said inner edge of said each blade.

3. The impeller of claim 1 wherein said leading edge of said blade and said trailing edge of said blade are aligned in parallel with each other.

4. The impeller of claim 3 wherein the extension of said leading edge of said blade intersects said axis of rotation as well as an imaginary line extending parallel to said axis of rotation, and the extension of said trailing edge of said blade intersects only said imaginary line.

5. The impeller of claim 3 wherein the extension of said trailing edge of said blade intersects said axis of rotation as well as an imaginary line extending parallel to said axis of rotation, and the extension of said trailing edge of said blade intersects only said imaginary line.

6. The impeller as claimed in either claim 4 or 5 wherein each blade has an associate separate imaginary line.

7. The impeller of either claim 4 or 5 wherein said imaginary lines associated with a respective one of said blades are arranged in the boundaries of a circle formed by the largest diameter of said cylindrical outer surface of said hub structure.

* * * * *